United States Patent
McLaughlin et al.

(10) Patent No.: US 6,752,135 B2
(45) Date of Patent: Jun. 22, 2004

(54) APPARATUS FOR AIR/FUEL RATIO CONTROL

(75) Inventors: Bryant K. McLaughlin, Fort Collins, CO (US); Justin L. Fulton, Fort Collins, CO (US); Larry O. Gray, Fort Collins, CO (US); Doyle Kent Stewart, LaPorte, CO (US); Gary McDaniel, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

(21) Appl. No.: 10/292,743

(22) Filed: Nov. 12, 2002

(65) Prior Publication Data

US 2004/0089279 A1 May 13, 2004

(51) Int. Cl.⁷ .............................................. F02D 41/14
(52) U.S. Cl. ....................... 123/688; 123/695; 123/697; 123/527
(58) Field of Search .................. 123/688, 695, 123/697, 527, 528, 529, 575; 73/118.1, 119 A, 118.2

(56) References Cited

U.S. PATENT DOCUMENTS

| | | | | |
|---|---|---|---|---|
| 5,353,765 A | * | 10/1994 | Saikalis et al. | 123/438 |
| 5,365,216 A | * | 11/1994 | Kotwicki et al. | 340/439 |
| 5,370,101 A | * | 12/1994 | Hamburg et al. | 123/688 |
| 5,505,183 A | * | 4/1996 | Sinha et al. | 123/688 |
| 6,052,989 A | * | 4/2000 | McCabe et al. | 60/285 |
| 6,055,963 A | * | 5/2000 | Brown et al. | 123/525 |
| 6,073,619 A | * | 6/2000 | Baranowski | 123/681 |
| 6,298,840 B1 | * | 10/2001 | Kerns | 123/681 |
| 6,378,511 B1 | * | 4/2002 | Wolters et al. | 123/575 |
| 6,397,583 B1 | * | 6/2002 | Davey et al. | 60/277 |
| 6,457,467 B1 | * | 10/2002 | O'Neill et al. | 123/683 |
| 6,523,341 B1 | * | 2/2003 | Rumpsa et al. | 60/277 |

FOREIGN PATENT DOCUMENTS

JP  128058  *  5/1998  .............. F01N/3/08

* cited by examiner

*Primary Examiner*—Hai Huynh
(74) *Attorney, Agent, or Firm*—Leydig, Voit & Mayer, Inc.

(57) ABSTRACT

A control valve module for gaseous fuels on spark ignited reciprocating engines is presented. The control valve module has a valve that controls gaseous fuel flow to a mixer or other device for air/fuel ratio control, an actuator for moving the valve position, and a controller. The controller receives a signal from a heated exhaust gas oxygen (HEGO) sensor that is an indication of the fuel/air ratio and actuates the valve to control the combustion mixture to a precise stoichiometric ratio.

18 Claims, 5 Drawing Sheets

APPARATUS FOR AIR/FUEL RATIO CONTROL

FIELD OF THE INVENTION

The present invention relates generally to a valve having at least one electronic air/fuel ratio control module, and more particularly to control valve module for air/fuel ratio control for gaseous-fueled engines operating with a near-stoichiometric air/fuel ratio.

BACKGROUND OF THE INVENTION

Trim valves are used in many industrial and commercial settings for a variety of applications. One application is the control of gaseous fuel flow to the combustion system of a gaseous fueled engine to maintain a desired air/fuel ratio. Examples of gaseous fuels are propane and natural gas. The combustion occurs in the engine cylinders. The air-fuel mixture is supplied to the cylinders from the engine intake manifold. For each cylinder head, an intake valve in the cylinder head opens to admit the air-fuel mixture from the intake manifold into each cylinder. After combustion, an exhaust valve in each cylinder head opens to allow the gaseous combustion products to flow to the exhaust manifold. The combustion gases may either be vented to the atmosphere or be ducted to a turbocharger, which derives energy from the hot exhaust gases to compress the air used by the engine.

The overall performance of the engine in terms of combustion efficiency, speed control, exhaust emission of pollutants and others, greatly depends on controlling the mixing of the air and fuel into an appropriate ratio for combustion and on regulating the flow of this mixture into the combustion part of the engine. Precise and reliable control of the combustion is very important for the efficiency and the safety of the combustion process, as is well understood by those skilled in the art. For example, it is well known that combusting a fuel with excess oxidant yields higher nitrogen oxides ($NO_x$) emission rates. Combustion of a fuel with an uncontrolled excess amount of air can also lead to excessive fuel consumption and increase the production cost of the final product. On the other hand, incomplete combustion of a fuel generates carbon monoxide (CO).

$NO_x$, CO and hydrocarbon (HC) emissions are regulated by the government to increasingly lower levels and in an ever increasing number of industries. In addition to the $NO_x$, CO and HC emissions, many designs must meet the requirements of regulatory agencies that have adopted the standards published by governments, insurers, and industry organizations (such as UL, CSA, FMRC, etc.).

Catalysts have been developed to reduce, and in some applications, eliminate, the emissions. A catalyst that simultaneously eliminates HC, CO, and NOx is referred to as a "three-way" catalyst. The use of a three-way catalyst will reduce the emissions of a stoichiometric engine. However, for these emission reductions to be reliable and maximized, and to protect the catalyst element from premature aging or damage, a very precisely controlled air/fuel ratio is required.

BRIEF SUMMARY OF THE INVENTION

The invention provides a control valve module for gaseous fuels on spark ignited reciprocating engines. The control valve module has a valve that controls gaseous fuel flow to a mixer or other device for air/fuel ratio control, an actuator for moving the valve position, and a controller. The controller receives a signal from a heated exhaust gas oxygen (HEGO) sensor that is an indication of the fuel/air ratio and actuates the valve to control the combustion mixture to a precise stoichiometric ratio.

The control valve module includes an interface for a user to configure parameters for one or two types of fuel. The user may select the fuel type, position dither amplitude and period, feedback strategy, and other control parameters.

Other advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention provides a control valve module for gaseous fuels on spark ignited reciprocating engines. The control valve module has an integrated actuator and integrated electronics suitable to receive a signal from a standard heated exhaust gas oxygen (HEGO) sensor. The HEGO sensor operates as a reference-gas sensor, and compares the residual oxygen in the exhaust gas with the oxygen in the reference atmosphere (air circulating inside the sensor). The active sensor ceramic is heated by the internal heating element. Sensor heating reduces the influence of the exhaust gas temperature on the sensor-ceramic temperature and therefore the temperature-dependent sensor functions. The HEGO sensor signal response to the air/fuel ratio is highly non-linear and is accounted for in the controller of the instant invention. The HEGO sensor output signal is an indication of the fuel/air ratio and is processed by on-board software to actuate the valve to control the combustion mixture to a precise stoichiometric ratio. When used in combination with a 3-way catalytic combustor, the resulting engine emissions meet or exceed certain industry and government standards. The control valve module includes a valve that controls gaseous fuel flow to a mixer or other device for air/fuel ratio control. The integrated electronics monitor system HEGO sensor output and adjusts fuel flow for optimum emissions performance.

Figure 1:
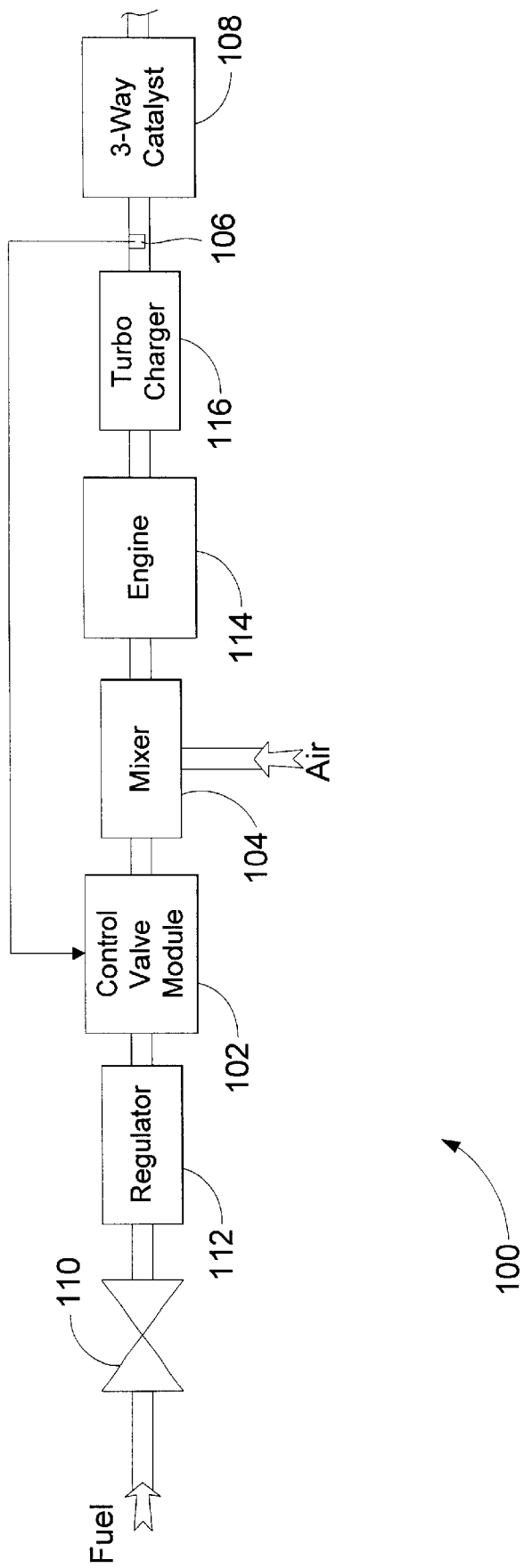
FIG. 1 is a block diagram view of a control valve module in accordance with the present invention installed as a component within a full authority fuel supply system typically used in smaller engine applications.

Turning to the drawings, wherein like reference numerals refer to like elements, the invention is illustrated as being implemented in a suitable engine environment. FIG. 1 illustrates an example of the invention used in five to one hundred kilowatt engine applications. The engine environment 100 includes control valve module 102 and fixed venturi mixer 104. The control valve module 102 incorporates a fuel flow control device for gaseous fuels on spark ignited reciprocating engines, an integrated actuator, and an integrated electronics module suitable to receive a signal from a standard heated exhaust gas oxygen (HEGO) sensor 106. The signal is processed by the integrated electronics module to actuate the control valve module 102 to control the combustion mixture to a precise stoichiometric ratio. When used in combination with a 3-way catalytic combustor 108, the resulting engine emissions meet or exceed many industry and government standards.

During operation, fuel flows through shut-off valve 110 and zero-pressure regulator 112 to the control valve module 102. It is recognized that zero-pressure regulator 112 is not needed in every engine application. The amount of fuel flowing to fixed venturi mixer 104 is controlled by control valve module 102. The fixed venturi mixer 104 mixes the fuel with air and the resulting air/fuel mixture is sent to the engine 114 for ignition as is known in the art. The exhaust gas from ignition flows through optional turbocharger 116 and the 3 way catalyst 108 to the atmosphere. HEGO sensor 106 is located before the 3 way catalyst 108.

Figure 2:
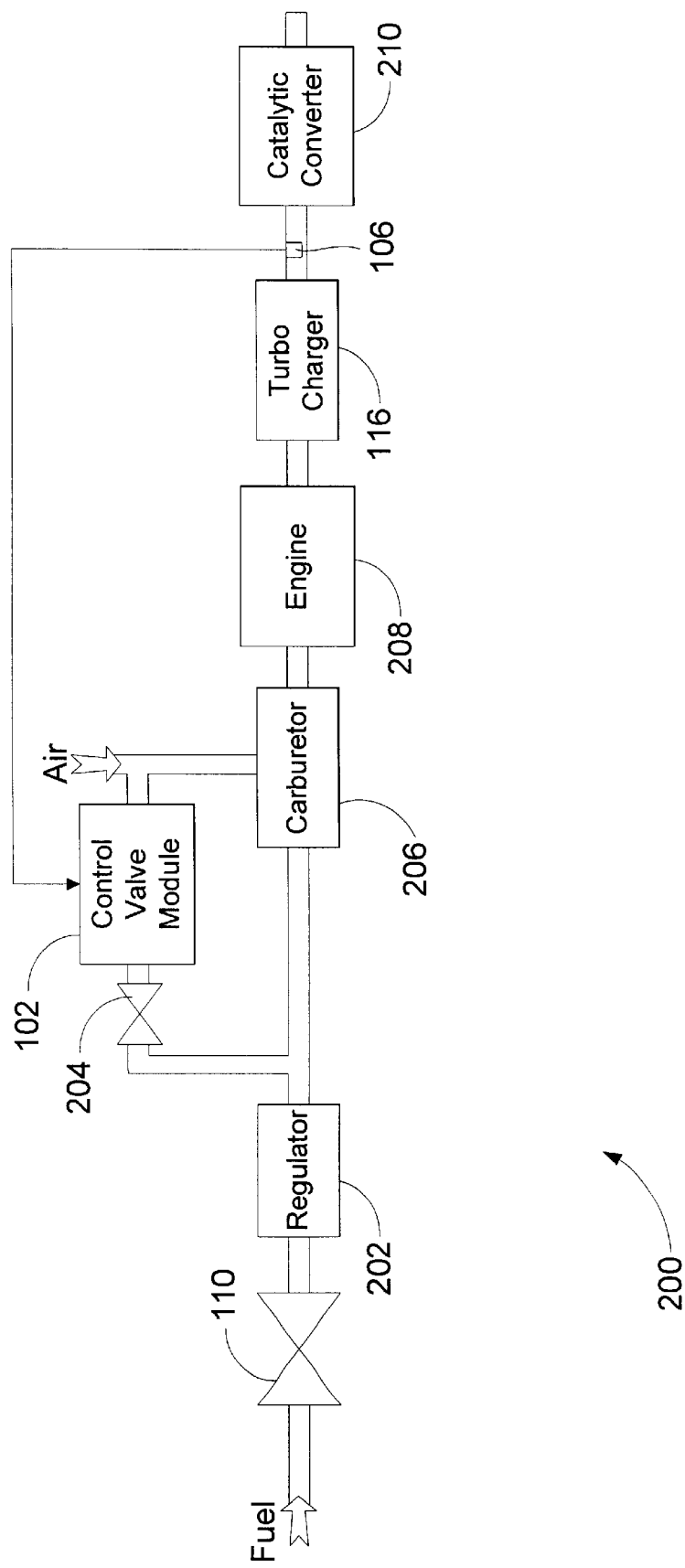
FIG. 2 is a block diagram view of a control valve module in accordance with the present invention installed as a component within a fuel trim valve application typically required with larger engine applications.

Turning now to FIG. 2, an example of the invention used in fifty to two hundred fifty kilowatt aftermarket engine applications is illustrated. The engine environment 200 includes control valve module 102, fuel shut-off 110, fuel regulator 202, manual shut-off valve 204, carburetor 206, engine 208, optional turbocharger 116, HEGO sensor 106, and catalytic converter 210 (e.g., 3 way catalyst 108). In this embodiment, control valve module 102 controls fuel by-pass flow.

Figure 3:
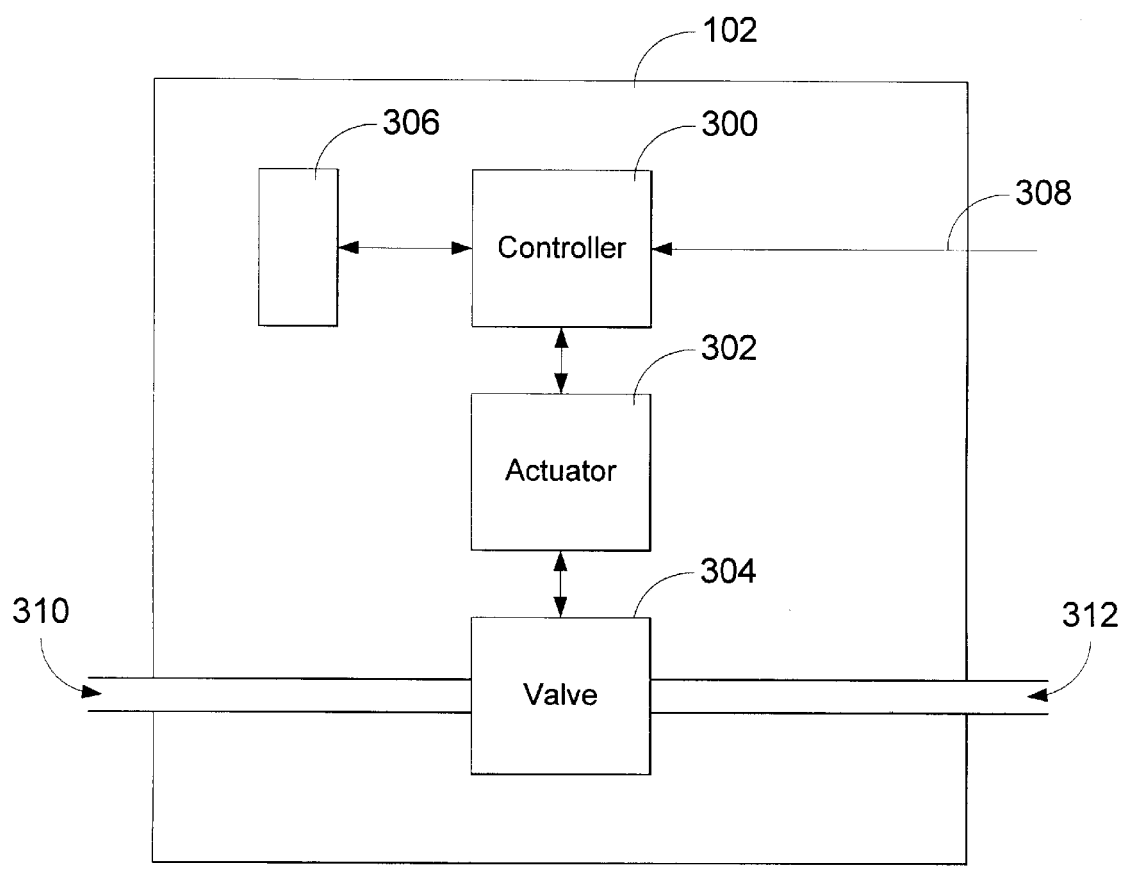
FIG. 3 is a block diagram of the control valve module of FIGS. 1 and 2.
Figure 5:
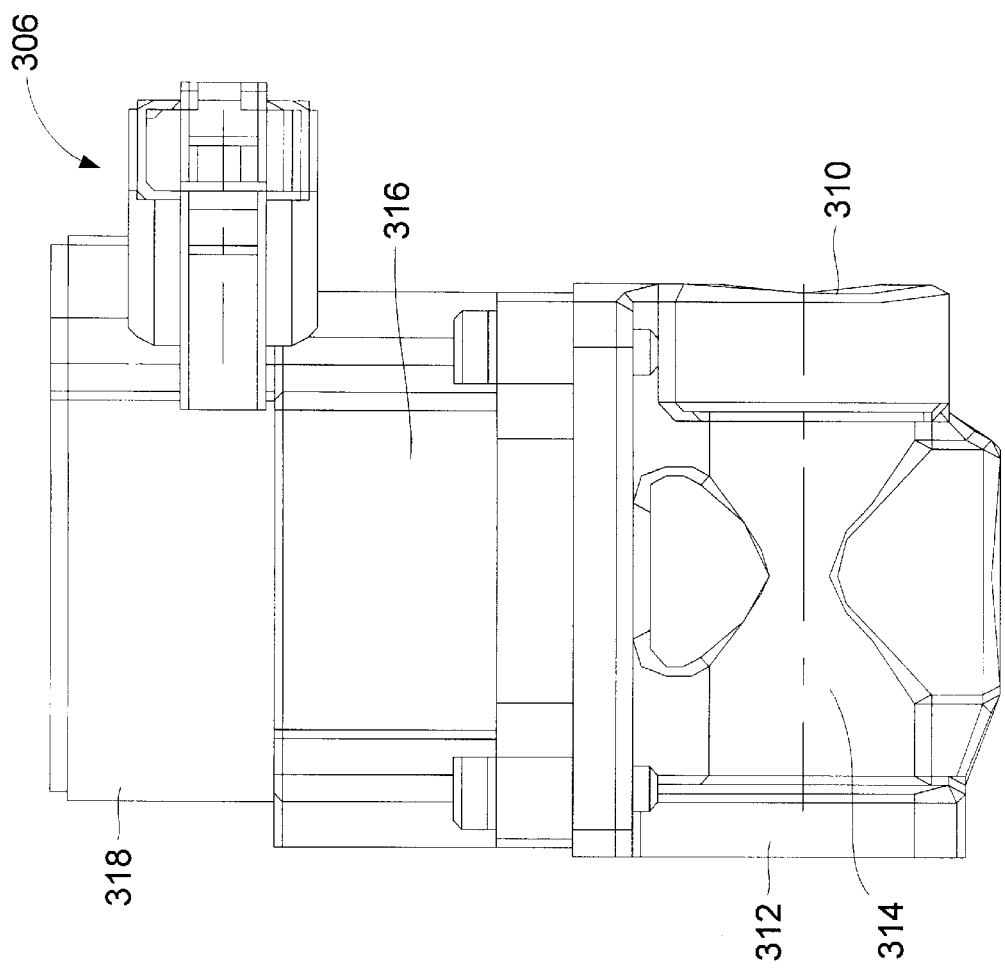
FIG. 5 is a front view of the control valve module of FIGS. 1 and 2.
Figure 4:
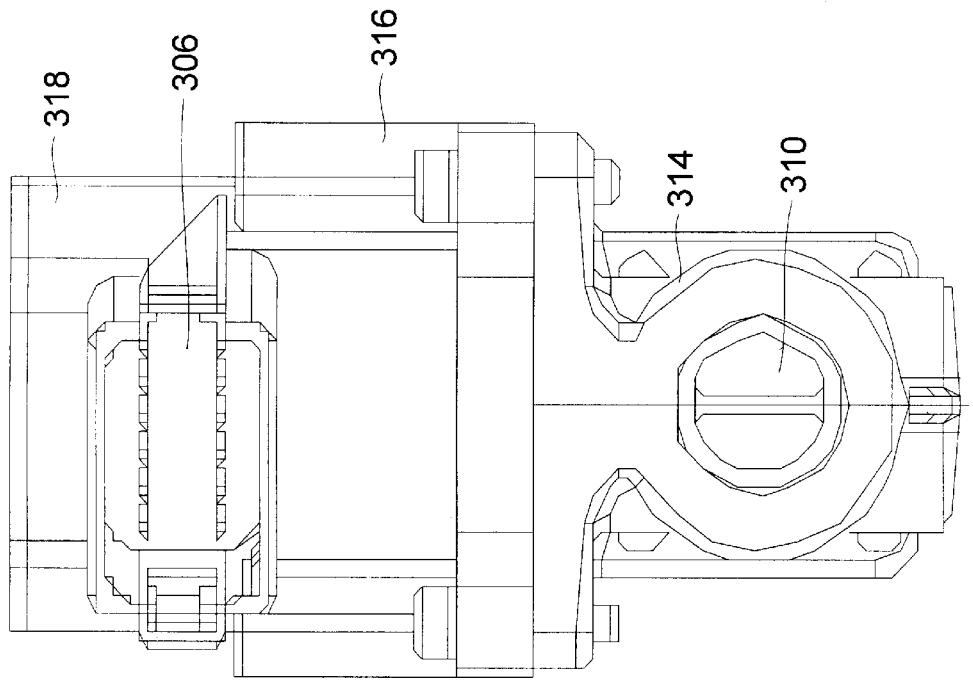
FIG. 4 is an end view of the control valve module of FIGS. 1 and 2.

Turning now to FIG. 3, a block diagram of the control valve module 102 is shown. The control valve module 102 includes controller 300, actuator 302, valve 304, and interface 306. Fuel enters at input 310 and exits at output 312. Valve 304 is moved by actuator 302, which is controlled by controller 300. The controller 300 is microprocessor based and accepts a signal directly from HEGO sensor 106 for closed-loop air/fuel ratio control. The signal may be received via line 308 or through the interface 306. Turning now to FIGS. 4 and 5, the valve 304 is located in a valve housing 314. The actuator 302 is integral with the valve 304 and is housed in housing 316. The controller is located above the actuator 302 in portion 318 of housing 316. The valve 304 may be a spool valve or other type of valve. In one embodiment, the valve bore size is 16 millimeters or 22 millimeters.

The control valve module 102 allows two different fuels to be used and has several positioning and HEGO feedback modes for control optimization. Setting calibration parameters may be performed with a PC and interface software tools. Other techniques known in the art may be used. The interface 306 includes auxiliary inputs that are used to manually select open loop operation and to select the primary-fuel or secondary-fuel set of control parameters and an output for driving a warning light or a relay. The user configurable calibration parameters are listed in Table 1 below.

TABLE 1

| Calibration Parameter | Range of Values |
| --- | --- |
| CL Delay Time | 0 to 500 sec |
| HEGO Voltage CL threshold | 1.0 to 1.2 VDC |
| Target HEGO Voltage (Fuel 1) | 0 to 1 VDC |
| Default Trim Valve Position (Fuel 1) | 0 to 60° (Minimum < Default < Maximum) |
| Minimum Trim Valve Position (Fuel 1) | 0 to 60" (Minimum < Default < Maximum) |
| Maximum Trim Valve Position (Fuel 1) | 0 to 60° (Minimum < Default < Maximum) |
| Target HEGO Voltage (Fuel 2) | 0 to 1 VDC |
| Default Trim Valve Position (Fuel 2) | 0 to 60° (Minimum < Default < Maximum) |
| Minimum Trim Valve Position (Fuel 2) | 0 to 60° (Minimum < Default < Maximum) |
| Maximum Trim Valve Position (Fuel 2) | 0 to 60° (Minimum < Default < Maximum) |
| Feedback Strategy | Steady State or Duty-Cycle |
| Position Dither Period | 100 to 2000 msec |
| Position Dither Amplitude | 0 to 100% (percentage of position) |
| P, I, D | Standard positioning dynamics parameters 0 to 100% |
| CLGain | 0 to 100% |

When power is applied to the control valve module 102, the control of valve 304 is open loop until the HEGO sensor voltage falls below a threshold value. Pull-up resistors are used to maintain the HEGO signal input at approximately 4.0V until the HEGO sensor 106 warms up. When the HEGO sensor 106 is at operating temperature and operating normally, the sensor impedance is low enough to draw the input down to its typical 0–1 V operating range. As the HEGO sensor 106 ages or is damaged (or if it becomes disconnected), the sensor impedance rises and the signal input is pulled up over the threshold value. As a result, the control will switch into open-loop operation. The default trim valve position is selected whenever the control is in open-loop mode. Open-loop operation at the default trim valve position is also manually selected by applying a voltage to a specified input of the control valve module 102.

Figure 6:
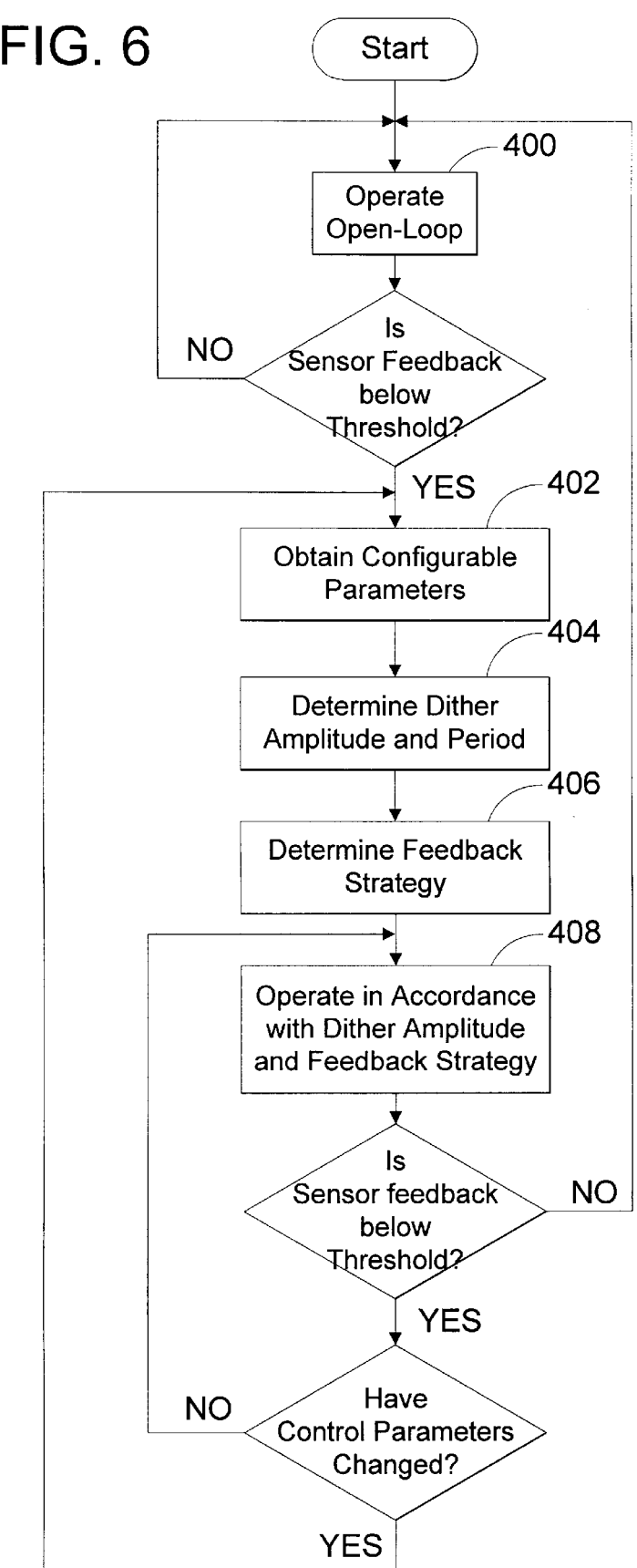
FIG. 6 is a flow chart illustrating a process for controlling gaseous fuel flow to maintain a stoichiometric air/fuel ratio in the engine applications of FIGS. 1 and 2.

Turning now to FIG. 6, the operation of the control valve module 102 will now be described. As previously described, the controller operates in open loop mode (step 400). When the HEGO sensor signal input is within the operating range, the controller 300 operates in a closed loop mode. The user configurable parameters are determined (step 402). The user inputs the desired fuel selection (e.g., fuel1 or fuel2) at the interface 306. The position dither amplitude and period is determined (step 404). The feedback strategy is determined (step 406). The valve 304 is operated in accordance with the dither amplitude and feedback strategy selected (step 408). If the HEGO sensor signal input falls above the threshold, the control switches to the open-loop mode. If control parameters change, the valve 304 is operated in accordance with the changed parameters.

There are three modes of closed loop operation. These modes are no position dither and steady state feedback strategy, position dither and steady state feedback strategy, and position dither and duty-cycle feedback strategy. In the no position dither and steady state feedback strategy, the controller 300 maintains constant valve position as long as the HEGO voltage error (i.e., the difference between the target HEGO voltage and the HEGO sensor voltage) is zero and the valve 304 is moved only to try to maintain the HEGO sensor voltage at the target voltage.

In the position dither and steady state feedback strategy, the operating mode is similar to the no position dither and steady state feedback strategy mode. Position dither is added that opens and closes the valve 304 a percentage of the average valve position every dither period regardless of HEGO sensor voltage. The average valve position still moves to try to maintain the HEGO sensor voltage at the target voltage, but the dither cycle is always added to the average position. Note that this control mode causes the engine air/fuel ratio to cycle slightly rich and lean with every position dither cycle. However, small dither amplitudes, short dither periods, and vee engine configurations will keep the HEGO sensor voltage relatively steady to enable steady-state closed loop control. When used in moderation and properly calibrated, this technique helps maintain a high catalyst temperature, and the emissions 'pumping' can help to keep the entire catalytic surface more active, especially with oversized catalysts.

When large catalysts are used, the amount of air/fuel ratio dithering necessary to realize the benefits described in the position dither and steady state feedback strategy mode may cause the HEGO sensor voltage to dither too much to allow effective steady-state closed loop control. This may be especially noticeable on single-bank engines where the exhaust is not blended between two cylinder banks or is diffused by extra plumbing. In this case, the position dither and duty-cycle feedback strategy mode is selected. In this mode, the average valve position is moved to try to maintain a 50% HEGO voltage duty-cycle as it cycles around the target voltage.

In one embodiment in all three modes, the closed-loop algorithm is essentially an integrator with the closed-loop gain value (e.g., CL Gain of table 1) setting the speed at which the position changes versus the HEGO voltage error (or duty cycle). In addition to the closed-loop gain value, the integrator gain changes by a factor of three as the valve position changes to account for the changes in the sensitivity of the air/fuel ratio versus valve position.

As previously mentioned, control valve module 102 allows two different fuels to be used. The user configurable calibration parameters allows the user to set the HEGO target voltage and valve position limits for the different fuels. The ability to use two different fuels allows 'on-the-fly' changes from one set of parameters to another based on the state of an input on the interface 306. Typically, this feature is used for bi-fuel configurations, such as switching from pipeline natural gas to stored LPG for an emergency electrical generator set. This feature can be used for other purposes, such as switching between two different HEGO target voltages for two different brands of oxygen sensors, etc. When switching between the fuel parameter sets, the controller 300 jumps the valve 304 to the default position for the selected fuel, then continues normal operation from the default position. The minimum and maximum position limits are chosen to cover normal variations in the fuel quality, variation in the mechanical components themselves, temperature differences between the fuel and air, etc.

The output of interface 306 is used for providing a warning. The warning may be a warning light, an alarm, etc. The warning occurs under two conditions. The first condition is when the controller is operating in the open loop mode or when the valve is pegged at a position limit. During power up when the HEGO sensor is not operational, a closed loop delay timer is used to keep the warning off for a programmable amount of time from initial power-up.

The controller 300 stores fault conditions in memory. These fault conditions include minimum position limit reached, maximum position limit reached, and HEGO sensor voltage above the threshold. However, the HEGO sensor voltage will not be stored after initial power-up until the voltage drops below the threshold and goes back above it again. Hysteresis on the threshold ensures that the fault will not be repeatedly set as the HEGO sensor signal passes through the threshold during warm-up. The fault codes are stored until reset with interface tools.

In one embodiment, the control valve module 102 in the aftermarket engine application allows a single fuel to be used. Switches on auxiliary inputs of interface 306 allow adjustment of default valve position, HEGO target voltage, and closed loop gain (i.e. CL Gain). No position dither with steady-state feedback is the only control mode provided. The calibration parameters are listed below in table 2.

TABLE 2

| Calibration Parameter | Range of Values |
|---|---|
| CL Delay Time | 0 to 500 sec |
| HEGO Voltage CL threshold | 1.0 to 1.2 VDC |
| Target HEGO Voltage | 0.05 to 0.95 VDC |
| Target HEGO Voltage Ramp Rate | 0.01 to 0.05 VDC/sec |
| Default Trim Valve Position | 0 to 60° |
|  | (Minimum < Default < Maximum) |
| Default Trim Valve Position Ramp Rate | 0 to 60" |
|  | (Minimum < Default < Maximum) |
| Minimum Trim Valve Position | 0 to 60° |
|  | (Minimum < Default < Maximum) |
| Maximum Trim Valve Position | 0 to 60° |
|  | (Minimum < Default < Maximum) |
| P, I, D | Standard positioning dynamics parameters 0 to 100% |
| CLGain | 0 to 100% |
| CL Gain Ramp Rate | 1 to 50%/sec |

The auxiliary inputs used shall be called aux 1, aux 2, and aux 3 for purposes of description. The aux 1 switch lowers a selected parameter and the aux 2 switch raises a selected parameter. Aux 3 determines which parameter is selected. There are three conditions that select whether the raise and lower inputs effect the default valve position, the HEGO target voltage, or the CL gain. The first condition is open loop operation. In open loop operation, the aux 1 and aux 2 switches affect the default valve position, regardless of the aux 3 state. The default position will move at a rate determined by the Default Trim Valve Position Ramp Rate parameter. A user tuning the system can cause the actuator to stay in open loop by simply disconnecting the HEGO sensor 106. By attaching a voltmeter to the disconnected HEGO sensor 106, the proper default position can be chosen to keep the open-loop HEGO response near the closed-loop voltage target. When the raise and lower switches are released (and after a delay of approximately 60 seconds), the final value for the default position is written to memory as a 'permanent' tuning value.

The second condition is when the controller 300 is operating closed-loop and the Aux 3 input is either tied to ground or open, the raise and lower switches on Aux 2 and Aux 1 affects the HEGO target voltage. The HEGO target voltage will move at a rate determined by the Target HEGO Voltage Ramp Rate parameter. When the raise and lower switches are released, the value for the HEGO voltage target is written to memory as a 'permanent' tuning value.

The third condition is when the controller 300 is operating closed-loop and the Aux 3 input is tied high. The raise and lower switches on Aux 2 and Aux 1 will affect the CL gain. The CL gain will move at a rate determined by the CL Gain Ramp Rate parameter. When the raise and lower switches are released, the value for the CL gain is written to memory as a 'permanent' tuning value.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A control valve module for controlling an air/fuel ratio in gaseous-fueled engines operating with a near-stoichiometric air/fuel ratio comprising:
   a valve module having a valve housing and a valve;
   an actuator having an actuator housing integral to the valve housing, the actuator controlling movement of the valve; and
   a control module integral to the actuator housing and having an interface, the control module in communication with the actuator, the control module comprising:
      comparator means for comparing a signal from a heated exhaust gas oxygen (HEGO) sensor to a target voltage to produce an error signal;
      actuator control means for commanding the actuator to move the valve from a default position to a new position based upon the error signal and one of a no position dither and steady state feedback strategy, a position dither and steady state feedback strategy, and a position dither and duty-cycle feedback strategy.

2. The control valve module of claim 1 further comprising an interface, the interface including:
   a first auxiliary input for selecting one of a first fuel and a second fuel;
   a second auxiliary input for manually selecting one of open loop control and closed loop control;
   at least one input for receiving the signal from the heated exhaust gas oxygen sensor;
   a plurality of power inputs.

3. The control valve module of claim 1 wherein the control module further comprises calibration means for calibrating control parameters, the parameters including a closed-loop delay time, a HEGO threshold value, a target HEGO voltage, a default valve position, a minimum valve position, and a maximum valve position.

4. The control valve module of claim 3 wherein the parameters further comprise a feedback strategy, a position dither period, and a position dither amplitude.

5. The control valve module of claim 3 wherein the parameters further include a default valve position ramp rate and a target HEGO voltage ramp rate.

6. The control valve module of claim 1 further comprising detection means for detecting if the HEGO sensor is aging, damaged, or disconnected.

7. The control valve module of claim 1 wherein the valve has a valve spool, the valve spool having a size of one of 16 millimeters and 22 millimeters.

8. A control valve module for controlling an air/fuel ratio in gaseous-fueled engines comprising:
   a valve;
   an actuator controllably connected to the valve for moving a valve position; and
   a controller in communication with the actuator, the controller comprising:
      a comparator for comparing a voltage signal from a heated exhaust gas oxygen (HEGO) sensor to a target voltage to produce an error signal; and
      a microprocessor for commanding the actuator to move the valve from a default position to a new position based upon the error signal and one of a no position dither and steady state feedback operation mode, a position dither and steady state feedback operation mode, and a position dither and duty-cycle feedback operation mode.

9. The control valve module of claim 8 further comprising an interface, the interface comprising:
   a plurality of auxiliary inputs for selecting one of a first fuel and a second fuel and manually selecting one of open loop control and closed loop control;
   at least one input for receiving the signal from the heated exhaust gas oxygen sensor;
   a plurality of power inputs.

10. The control valve module of claim 8 wherein the control module further comprises a mechanism for allowing a user to change control parameters, the control parameters including a closed-loop delay time, a HEGO threshold value, a target HEGO voltage, a default valve position, a minimum valve position, and a maximum valve position.

11. The control valve module of claim 10 wherein the control parameters further include a feedback strategy setting, a position dither period, and a position dither amplitude.

12. The control valve module of claim 11 wherein the feedback strategy setting comprises one of a steady state mode and a duty-cycle mode.

13. The control valve module of claim 10 wherein the control parameters further include a default valve position ramp rate and a target HEGO voltage ramp rate.

14. The control valve module of claim 10 wherein the mechanism comprises:
   a first auxiliary input for increasing a parameter value;
   a second auxiliary input for decreasing the parameter value; and
   a third auxiliary input for selecting one of the control parameters.

15. The control valve module of claim 8 wherein the valve has a valve spool, the valve spool having a size of one of 16 millimeters and 22 millimeters.

16. The control valve module of claim 8 wherein the valve is located in a valve housing and the actuator is housed in an actuator housing integral with the valve housing.

17. The control valve module of claim 16 wherein the controller is located in the actuator housing.

18. The control valve module of claim 8 wherein the comparator is a software block executed by the microprocessor.

* * * * *